(12) United States Patent
Nicolson, IV et al.

(10) Patent No.: US 7,644,191 B2
(45) Date of Patent: Jan. 5, 2010

(54) LEGACY-COMPATIBLE EXTENDED COMMAND INPUT-OUTPUT CONTROL BLOCK

(75) Inventors: Alexander Nicolson, IV, Costa Mesa, CA (US); Gregory John Scherer, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 698 days.

(21) Appl. No.: 10/987,429

(22) Filed: Nov. 12, 2004

(65) Prior Publication Data

US 2006/0106949 A1 May 18, 2006

(51) Int. Cl.
*G06F 3/00* (2006.01)
(52) U.S. Cl. .................................. 710/5; 710/1; 710/30
(58) Field of Classification Search .................. 709/212; 710/1–5, 15–16, 30, 33
See application file for complete search history.

(56) References Cited

U.S. PATENT DOCUMENTS

| | | | |
|---|---|---|---|
| 5,479,638 A | 12/1995 | Assar et al. | |
| 5,606,660 A | 2/1997 | Estakhri et al. | |
| 6,047,279 A * | 4/2000 | Barrack et al. | ................. 706/60 |
| 6,145,051 A | 11/2000 | Estakhri et al. | |
| 6,262,918 B1 | 7/2001 | Estakhri et al. | |
| 6,374,337 B1 | 4/2002 | Estakhri | |
| 6,567,307 B1 | 5/2003 | Estakhri | |
| 7,308,524 B2 * | 12/2007 | Grundy et al. | .............. 711/103 |
| 2005/0152314 A1 * | 7/2005 | Sun et al. | ..................... 370/334 |

* cited by examiner

*Primary Examiner*—Alford W Kindred
*Assistant Examiner*—Richard Franklin
(74) *Attorney, Agent, or Firm*—Morrison & Foerster LLP (57) ABSTRACT

A 32-word command IOCB format is disclosed. A conventional 8-word format is supported, although in both cases 32-word command IOCBs are used. When the conventional 8-word format is used, the host sets the LE bit=1 and writes a conventional 8-word command IOCB into words 0-7 of the 32-word command IOCB. The firmware performs a DMA operation and reads the LE bit. With the LE bit=1, the firmware knows to read only words 0-7. When the new 32-word format is used, the host sets the LE bit=0 and writes a 32-word IOCB command into the 32-word command IOCB, including command and response buffer pointers, one or more data buffer pointers, and perhaps the command buffer. The firmware performs a DMA operation and reads the LE bit. With the LE bit=0, the firmware knows to read all 32 words of the command IOCB.

28 Claims, 4 Drawing Sheets

LEGACY-COMPATIBLE EXTENDED COMMAND INPUT-OUTPUT CONTROL BLOCK

BACKGROUND OF THE INVENTION

1. Field of the Invention

The present invention relates, generally, to the use of command I/O control block (IOCB) entries to facilitate communications between a host and a host interface port, and in particular embodiments, to a new format for command IOCB entries that reduces the number of direct memory access (DMA) operations required by the host interface port to read and execute a command.

2. Description of Related Art

Figure 1:
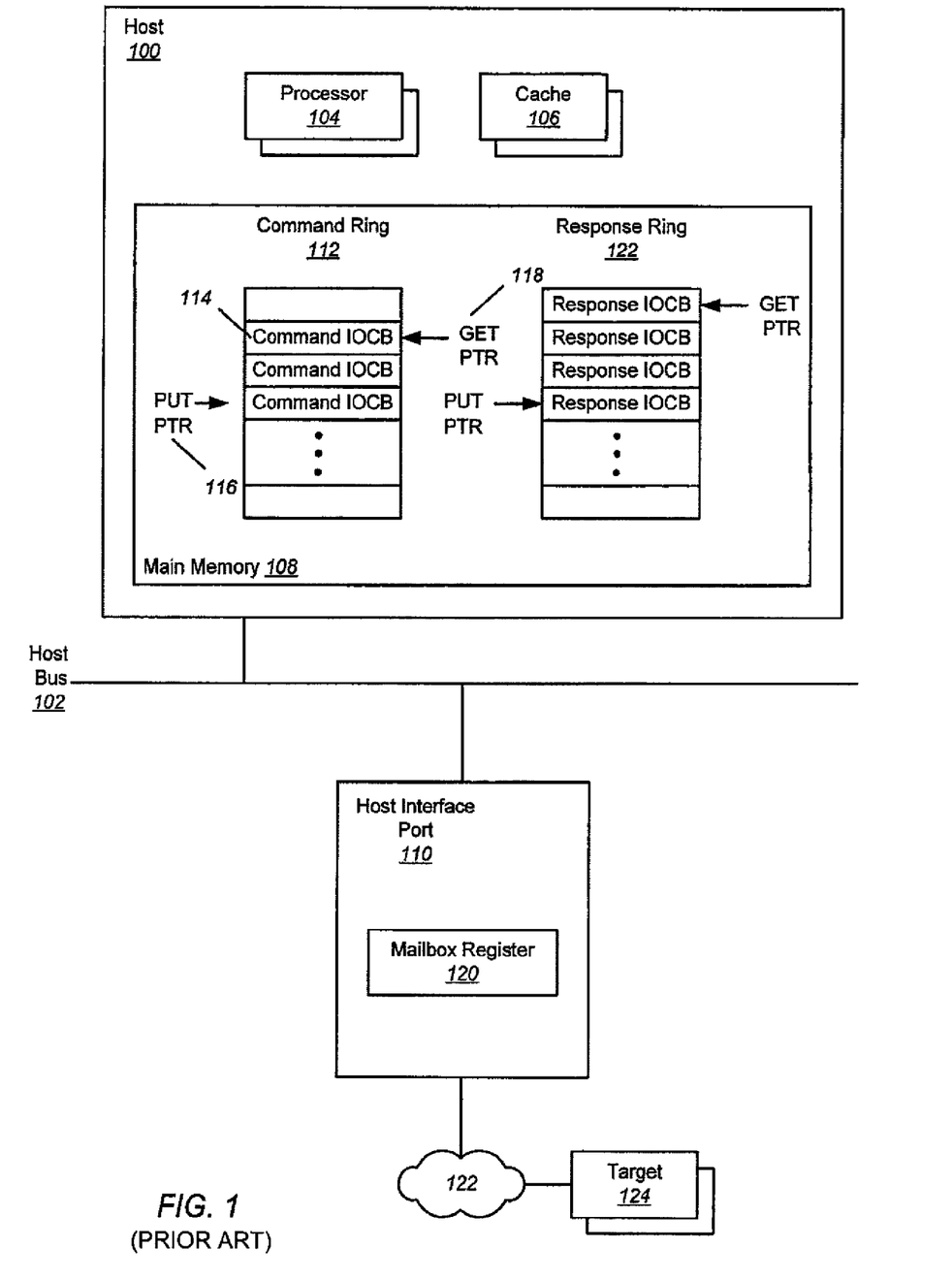
FIG. 1 illustrates a conventional computing system and a command ring for storing command IOCBs.

A generalized representation of an exemplary conventional computing system is illustrated in FIG. 1. A computer or server identified generally herein as a host 100 is connected to a host bus 102 (e.g. a PCI-X bus). The host 100 typically includes one or more host processors 104, cache 106, and main memory 108. Also attached to the host bus 102 is at least one port (e.g. a host bus adapter (HBA), an I/O controller, or the like), which is configured by its firmware as an interface to the host 100 and referred to generally herein as a host interface port 110. The host interface port allows communications between the host 100 and one or more targets 124 across a network 122 using protocols such as Fibre Channel (FC), Serial Attached SCSI (SAS), and Serial ATA (SATA). The host 100 and the host interface ports 110 may all reside within the same chassis. The host 100 and the host interface port 110 must frequently communicate over the host bus 102. Two main messaging mechanisms are typically provided for enabling such communications. One mechanism is a mailbox 120, which handles asynchronous commands. For example, the host 100 may send a mailbox command to the host interface port 110, and wait for it to be completed and passed back. During this time, no other mailbox command can be executed. Another mechanism utilizes command rings 112 and response rings 122 in main memory 108, which may comprise a circular queue or other data structure that performs a similar function. In general, rings are used to pass information across the host bus 102 between the host 100 and the host interface port 110. For example, the host 100 may ask for service from the host interface port 110 via a command written into a command ring 112 in main memory 108 of the host 100. When the host interface port 110 reads the command from the command ring 112, it processes the command, and when the command is complete the host interface port 110 writes a response into the response ring 122.

The command ring 112 stores command blocks or representations such as command IOCBs 114 that are to be presented to the host interface port 110. In conventional command IOCB formats, each command IOCB 114 has a relatively small fixed size (e.g. eight 32-bit words, or 32 bytes). A command IOCB 114 contains a pointer that can be used to obtain all of the command information needed by the host interface port 110 to carry out a command. When the host 100 writes a command IOCB 114 into the command ring 112, it also increments an index known as a put pointer 116 to indicate that a new command IOCB 114 has been placed into the command ring 112. When the host interface port 110 reads a command IOCB 114 from the command ring 112, it increments a get pointer 118 to indicate that a command IOCB 114 has been read from the command ring 112. In general (excluding for the moment the fact that the command ring 112 is a circular ring that wraps around), if the put pointer 116 is equal to the get pointer 118, the command ring 112 is empty. If the put pointer 116 is ahead of the get pointer 118, there are commands 114 in the command ring 112 to be read by the host interface port 110. If the put pointer 116 is one less than the get pointer 118, the command ring 112 is full. When the firmware in the host interface port 110 reads the values of the get pointer 118 and put pointer 116 and determines that there is a command IOCB 114 to be read from the command ring 112, it performs a DMA operation to read the command IOCB 114.

Figure 2:
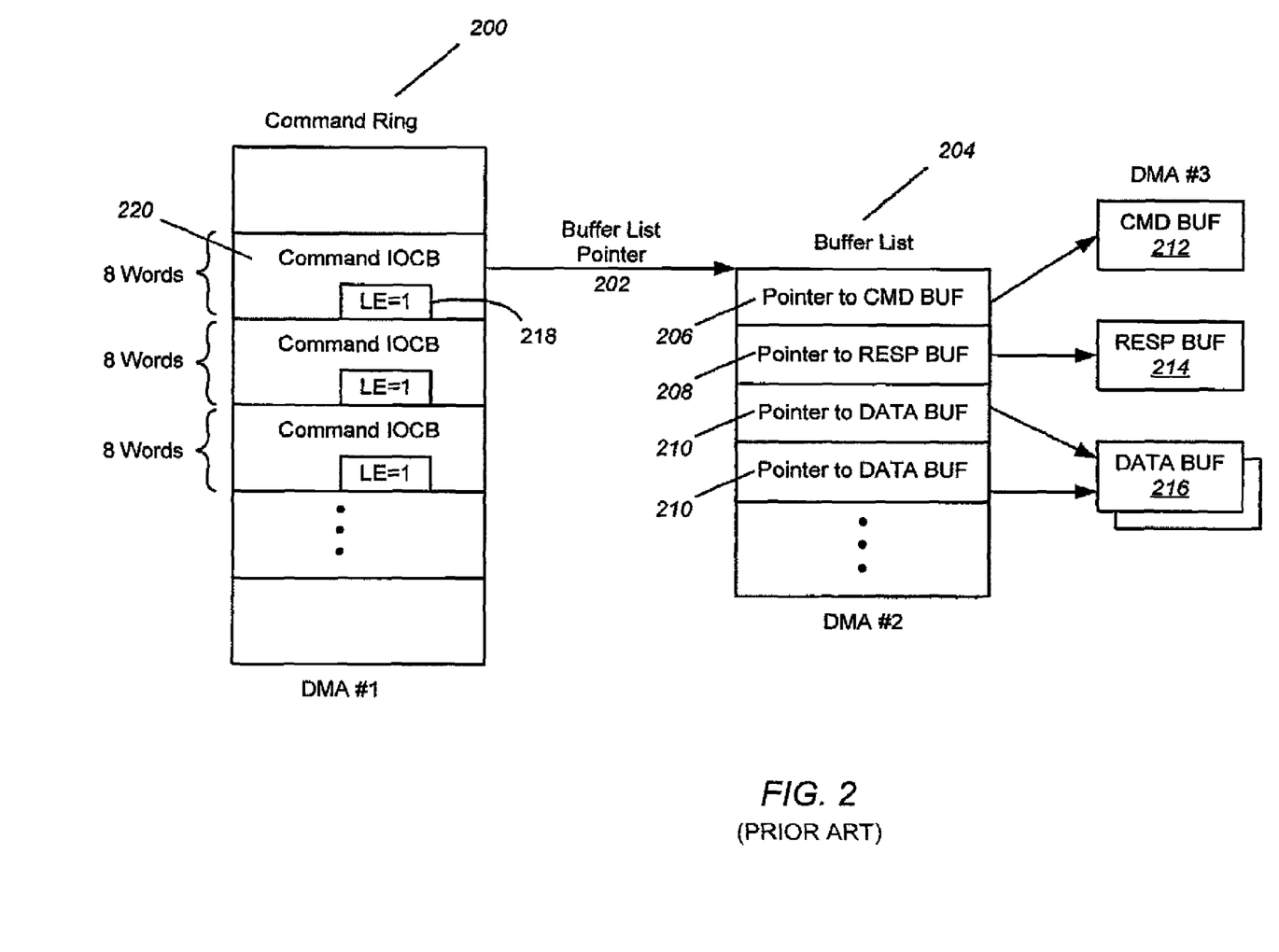
FIG. 2 illustrates an exemplary command ring and DMA operations needed to read the command, response and data buffers.

Referring now to the example of FIG. 2, to process a command IOCB 220, a host interface port must perform a DMA operation to read the command IOCB 220 from command ring 200 in the main memory of a host. By reading the command IOCB 220, a buffer list pointer 202 is obtained that points to a buffer list 204 stored in main memory.

The host interface port must then perform a second DMA operation to read the contents of the buffer list 204, which includes a command buffer pointer 206, a response buffer pointer 208, and one or more data buffer pointers 210. The command buffer pointer 206 points to a command buffer 212 stored in main memory, the response buffer pointer 208 points to a response buffer 214 stored in main memory, and the one or more data buffer pointers 210 point to one or more data buffers 216 stored in main memory. The command buffer 212 contains command arguments for communications between the host and a remote target. The response buffer 214 contains a zero if the target did not encounter any anomalies when processing the command. However, if the target detects an anomaly, it writes nonzero status information into the response buffer 214. The one or more data buffers 216 store the command data. The command, response and data buffers and their associated pointers are generally identified collectively or individually herein as command information.

The host interface port must then perform a third DMA operation to read the contents of the command buffer 212. In addition, depending on the type of command, the host interface port may have to perform additional DMA operations to read the contents of the one or more data buffers 216. Each of these DMA operations contributes to the overall inefficiency in processing commands between the host and the host interface port.

It should also be noted that in conventional command IOCB formats, a Last Entry (LE) bit 218, which was historically utilized for other purposes, is set equal to one in every command IOCB to indicate that the command IOCB supports the processing of 64-bit buffer descriptor entries (BDEs) which include an address, length, and flag byte.

However, with the advent of 64-bit addressing, the relatively small fixed size of a command IOCB in conventional formats (e.g. only eight words or 32 bytes) is generally insufficient to hold all of the information (e.g. control codes, command arguments and the like) needed to process commands between the host and the host interface port. In addition, as mentioned above, each command IOCB requires at least three DMA operations to extract the command information.

Therefore, there is a need for a new command IOCB format to hold all of the information needed in a command, and to reduce the number of DMA operations needed to read all of the information in a command.

SUMMARY OF THE INVENTION

Embodiments of the present invention utilize a new 32-word (128 byte) command IOCB format for entries written into a command ring entry by host driver software. The present invention ensures compatibility between the host driver software and firmware running in the host interface port, even when one or the other does not support the new 32-word command IOCB format. To ensure backwards compatibility, the present invention supports a conventional 8-word (32 byte) command IOCB format in addition to the new 32-word command IOCB format, although in both cases 32-word command IOCBs are used. To accomplish this, the LE bit, which was always set to one in the conventional IOCB format, is now recast as a "Little Edition" bit, and is used to distinguish between the conventional 8-word command IOCB format and the 32-word command IOCB format. In particular, an LE bit set to zero indicates the new 32-word command IOCB format, while an LE bit set to one indicates the conventional 8-word command IOCB format.

When the conventional 8-word command IOCB format is to be used, the host sets the LE bit to one and writes a conventional 8-word command IOCB into words 0-7 of the 32-word command IOCB. Words 8-31 are ignored. The command ring put pointer is then incremented by 128 (bytes) to point to the next 32-word entry in the command ring. When the firmware in the host interface port reads the put pointer and the get pointer and determines that there is a command IOCB to be read from the command ring, the firmware performs a DMA operation and reads all or part of the 32-word command IOCB, including the LE bit (which contains a one as expected in the conventional 8-word command IOCB format). When the firmware determines that the LE bit is set to one, the firmware knows that only words 0-7 are valid. As in the conventional 8-word command IOCB format, words 0-7 include a buffer list pointer to a buffer list. The buffer list contains a command buffer pointer that points to a command buffer, a response buffer pointer that points to a response buffer, and one or more data buffer pointers that point to one or more data buffers. Additional DMA operations are required to read the buffer list and the command buffer. The command ring get pointer is then incremented by 128 to point to the next 32-word entry in the command ring.

When the new 32-word command IOCB format is to be used, the host sets the LE bit to zero and writes command information into words 8-31 of the 32-word command IOCB. The command information includes the command buffer pointer, the response buffer pointer, one or more data buffer pointers, and if there is sufficient room in the 32-word command IODB, the command buffer. The command ring put pointer is then incremented by 128 to point to the next 32-word entry in the command ring. When the firmware in the host interface port reads the put pointer and the get pointer and determines that there is a command IOCB to be read from the command ring, the firmware performs a DMA operation and reads all or part of the 32-word command IOCB, including the LE bit (which contains a zero to indicate the 32-word command IOCB format). When the firmware determines that the LE bit is set to zero, the firmware that potentially words 8-31 of the command IOCB are valid and may contain the command buffer pointer, response buffer pointer, one or more data buffer pointers, and perhaps the command buffer. The command ring get pointer is then incremented by 128 to point to the next 32-word entry in the command ring. Because the command buffer pointer, response buffer pointer, one or more data buffer pointers, and perhaps the command buffer are all obtained in that single DMA operation, at least two DMA operations are saved.

DETAILED DESCRIPTION OF PREFERRED EMBODIMENTS

In the following description of preferred embodiments, reference is made to the accompanying drawings that form a part hereof, and in which is shown by way of illustration specific embodiments in which the invention may be practiced. It is to be understood that other embodiments may be utilized and structural changes may be made without departing from the scope of the preferred embodiments of the present invention.

Embodiments of the present invention utilize relatively large (as compared to conventional command IOCBs) fixed size command IOCBs (e.g. a 32-word or 128 byte command IOCB) as entries in the command ring entry. Note that for purposes of simplifying the explanation herein, the conventional command IOCB format will be described as an 8-word (32 byte) format, and the extended format according to embodiments of the present invention will be described as a 32-word (128 byte) format. However, it should be understood that these values are exemplary only, and that conventional or extended command IOCB formats with different sizes may be used.

In computing systems such as those with host driver software running in the host and firmware running in the host interface port, and especially when the host and host interface port are designed, manufactured or sold by different entities, compatibility issues arise when new formats are introduced. Therefore, embodiments of the present invention ensure compatibility between the host driver software and firmware running in the host interface port, even when one or the other does not support the new 32-word command IOCB format. To ensure backwards compatibility, embodiments of the present invention support the conventional 8-word command IOCB format in addition to the new 32-word command IOCB format, although in both cases 32-word command IOCBs are used. To accomplish this, the LE bit, which was always set to one in the conventional IOCB format, is now recast as a "Little Edition" bit, and is used to distinguish between the conventional 8-word command IOCB format and the 32-word command IOCB format according to embodiments of the present invention. In particular, in one embodiment, an LE bit set to zero indicates the new 32-word command IOCB format, while an LE bit set to one indicates the conventional 8-word command IOCB format.

Before any command IOCBs can be stored in the command ring, the host must first determine if the host interface port supports the 32-word command IOCB format. The host polls the host interface port by sending a mailbox command. The host interface port will respond either negatively or positively. If the host interface port's response to the mailbox command indicates that the host interface port does not support the 32-word command IOCB format, then the conventional 8-word command IOCB format must be used. If the host interface port's response indicates that it supports the new 32-word command IOCB format, then the new 32-word command IOCB format may be used.

Figure 3:
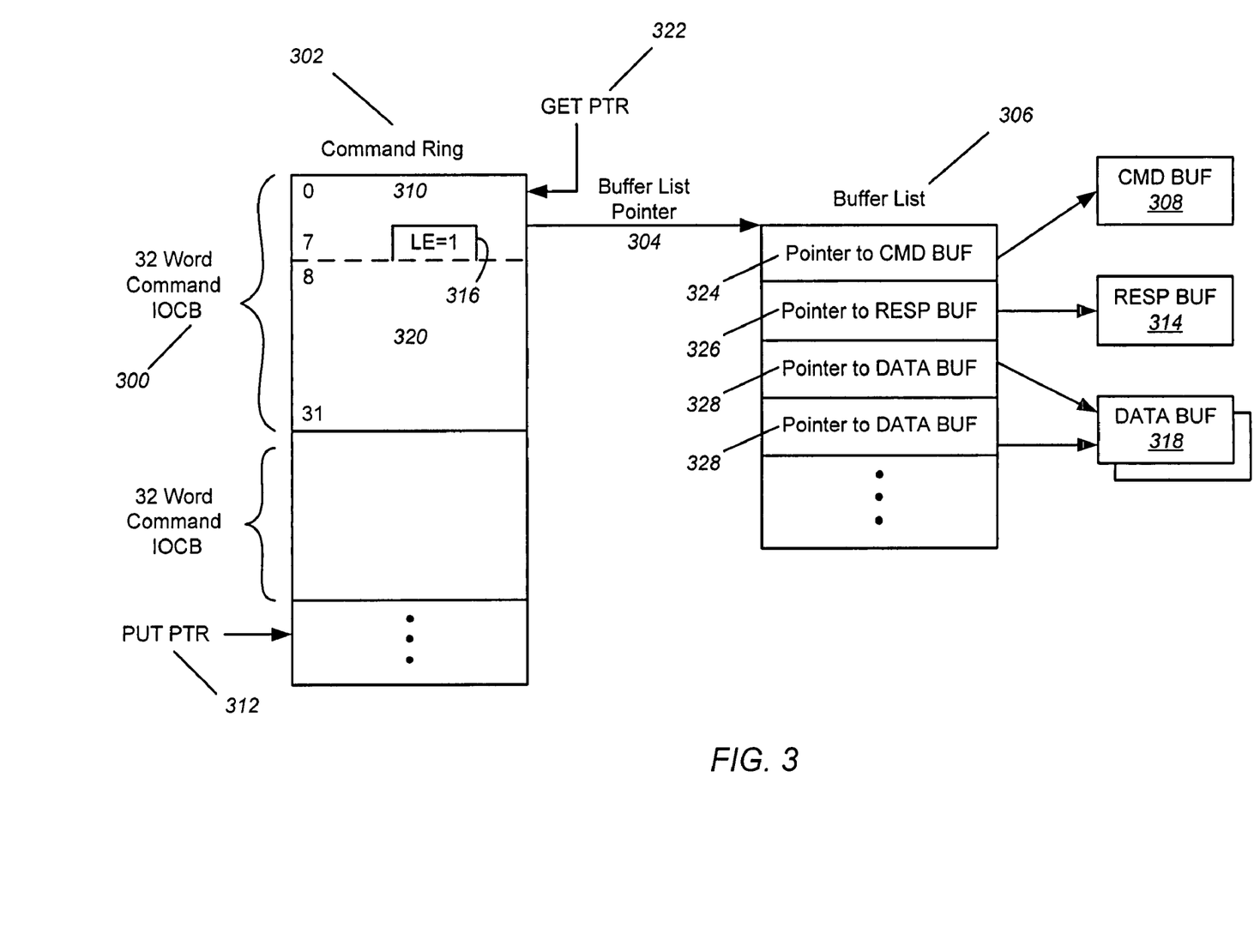
FIG. 3 illustrates an exemplary command ring containing a 32-word command IOCB with an LE bit set to one (conventional 8-word command IOCB format) according to embodiments of the present invention.

FIG. 3 illustrates a command ring 302 containing a 32-word command IOCB 300 with an LE bit 316 set to one (conventional 8-word command IOCB format) according to a specific, preferred embodiment of the present invention. When the conventional 8-word command IOCB format is to be used, the host sets the LE bit 316 to one and writes a conventional 8-word command IOCB into a first portion 310 (e.g. words 0-7) of the command IOCB 300. A second portion 320 (e.g. words 8-31) is ignored. The command ring put pointer 312 is then incremented by 128 (bytes) to point to the next 32-word entry in the command ring 302. The changes required by the driver software are therefore minimal.

When the firmware in the host interface port reads the put pointer 312 and the get pointer 322 and determines that there is a command IOCB to be read from the command ring 302, the firmware performs a DMA operation and reads the first portion 310 the 32-word command IOCB 300, including the LE bit 316 (which contains a one as expected in the conventional 8-word command IOCB format). During this same DMA operation, the second portion 320 may be read as well. When the firmware determines that the LE bit is set to one, the firmware knows that only words 0-7 are valid. In alternative embodiments, the firmware may not read the second portion 320 if the LE bit is set to one. As in the conventional 8-word command IOCB format, words 0-7 include a buffer list pointer 304 to a buffer list 306. The buffer list 306 contains a command buffer pointer 324 that points to a command buffer 308, a response buffer pointer 326 that points to a response buffer 314, and one or more data buffer pointers 328 that point to one or more data buffers 318. Additional DMA operations are required to read the buffer list 306 and the command buffer 308. Thus, the first portion (e.g. words 0-7) carries the same information and are utilized in the same way as in the conventional 8-word command IOCB format. The second portion 320 (e.g. words 8-31) are ignored. The command ring get pointer 322 is then incremented by 128 to point to the next 32-word entry in the command ring 302.

Figure 4:
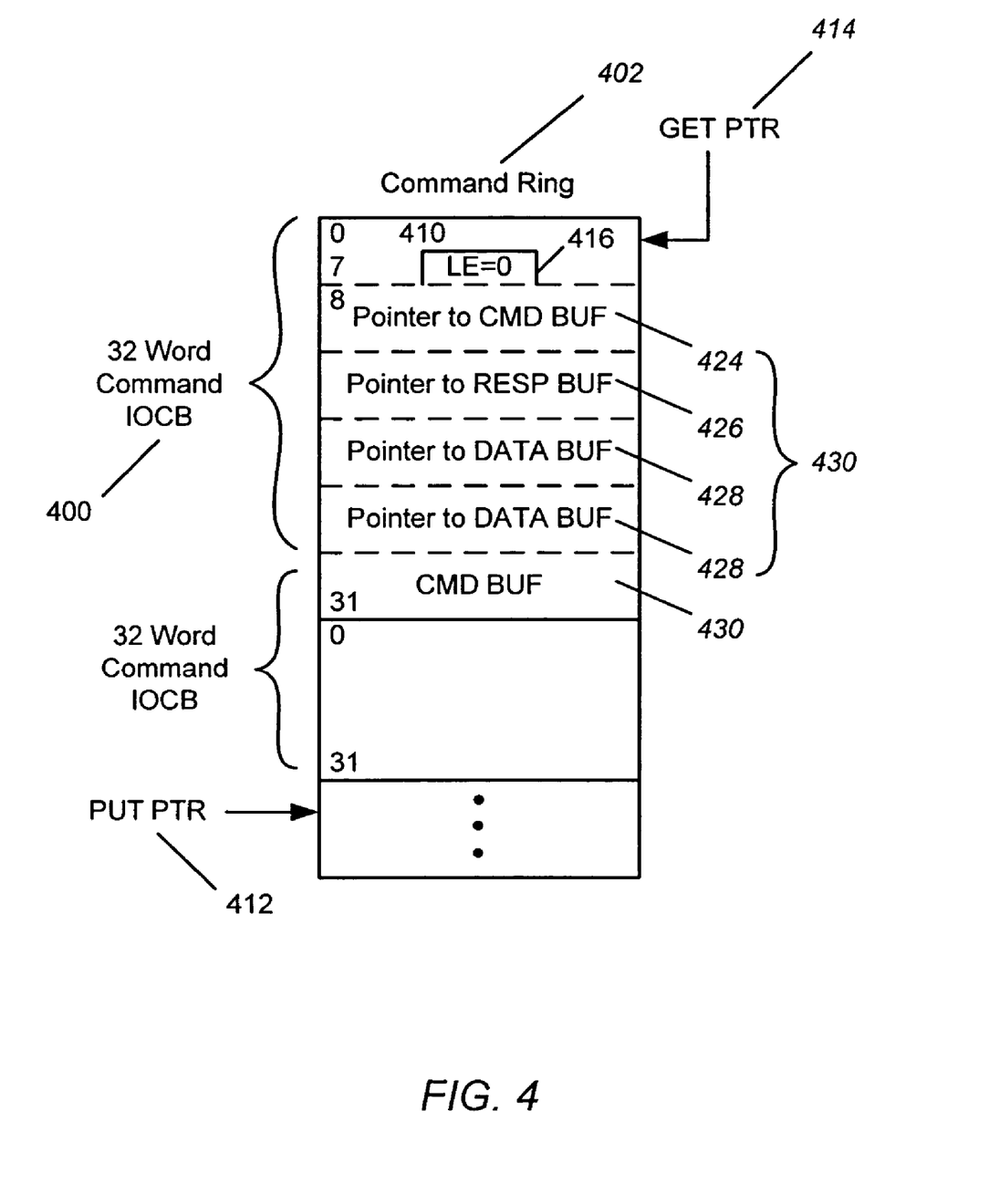
FIG. 4 illustrates an exemplary command ring containing a 32-word command IOCB with an LE bit set to zero (new 32-word command IOCB format) according to embodiments of the present invention.

FIG. 4 illustrates an exemplary command ring 402 containing a 32-word command IOCB 400 with an LE bit 416 set to zero (new 32-word command IOCB format) according to a specific, preferred embodiment of the present invention. Note that the LE bit 416 is located in the same space in the command IOCB as in the conventional format. When the new 32-word command IOCB format is to be used, the host sets the LE bit 416 to zero in a first portion 410 (e.g. bits 0-7) of the 32-word command IOCB 400, and writes command information into a second portion 430 (e.g. words 8-31) of the 32-word command IOCB 400. The command information may include a command buffer pointer 424, a response buffer pointer 426, one or more data buffer pointers 428, and if there is sufficient room in the 32-word command IOCB 400, the command buffer 430. The command ring put pointer 412 is then incremented by 128 to point to the next 32-word entry in the command ring 402.

When the firmware in the host interface port reads the put pointer 412 and the get pointer 414 and determines that there is a command IOCB to be read from the command ring 402, the firmware performs a DMA operation and reads the first portion 410 the 32-word command IOCB 400, including the LE bit 416 (which contains a zero to indicate the 32-word command IOCB format). During this same DMA operation, the second portion 420 may be read as well. When the firmware determines that the LE bit 416 is set to zero, the firmware knows that potentially words 8-31 of the command IOCB 400 are valid and may contain the command buffer pointer 424, response buffer pointer 426, one or more data buffer pointers 428, and perhaps the command buffer 430. The command ring get pointer is then incremented by 128 to point to the next 32-word entry in the command ring 402. Because the command buffer pointer 424, response buffer pointer 426, one or more data buffer pointers 428, and perhaps the command buffer 430 are all obtained in that single DMA operation, at least two DMA operations are saved. The command buffer pointer 424, response buffer pointer 426, and one or more data buffer pointers 428 are then used to locate the command buffer, response buffer, and the one or more data buffers, from which additional command information may be read.

Even if the host and host interface port both support the new 32-word command IOCB format, no major changes to the command IOCBs are immediately required. Both the host and the host interface port can initially communicate using the conventional 8-word command IOCB format with the LE bit set to one in the new 32-word command IOCBs. Over time, if there are particular commands for which faster execution (i.e. fewer DMA operations) and greater throughput is desired, special command IOCBs may be written with the LE bit set to zero and including the command buffer pointer, response buffer pointer, data buffer pointer and possibly the command buffer.

If the host driver software does not support the 32-word command IOCB format, then it will not poll the host interface port using a mailbox command, but rather it will simply write 8-word command IOCBs into the command ring and set the LE bit to one, as illustrated in FIG. 2. The put pointer is then incremented by 32 (bytes) to point to the next 8-word entry in the command ring. When the firmware in the host interface port reads the put pointer and the get pointer and determines that there is a command IOCB to be read from the command ring, the firmware performs a DMA operation and reads the LE bit (which contains a one as expected in the conventional 8-word command IOCB format). With the LE bit set to one, the firmware knows to read only words 0-7 as in the conventional 8-word command IOCB format. The command ring get pointer is then incremented by 32 to point to the next 8-word entry in the command ring.

As described above, driver software executable on the host, and firmware executable on the host interface port may be written to implement the embodiments of the present invention described above. However, in alternative embodiments, the features described above may be implemented in software, firmware, or hardware.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A method for obtaining command information by reading a fixed size command block in either a conventional or extended format in a command ring within a host, comprising:

performing a read operation to read a first portion of the command block;

determining a state of a little edition (LE) bit stored in a location within the first portion of the command block that is unchanged in either the conventional or extended format;

utilizing the command block according to the conventional format to locate and read the command information from the first portion of the command block if the LE bit is set to one; and utilizing the command block according to the extended format to locate and read the command information from a second portion of the command block, and determining a command buffer pointer, a response buffer pointer, and one or more data buffer pointers from the second portion of the command block if the LE bit is set to zero.

2. The method as recited in claim 1, further comprising:
if the LE bit is set to one,
determining a buffer list pointer from the first portion of the command block according to the conventional format, and
utilizing the buffer list pointer and one or more additional read operations to locate and read the command information.

3. The method as recited in claim 1, further comprising reading a command buffer from the second portion of the command block if the LE bit is set to zero.

4. A method for writing command information in a fixed size command block in either a conventional or extended format in a command ring within a host so that it can be read by a host interface port using either the conventional or extended format, comprising:
if the conventional format is used,
setting a little edition (LE) bit in a first portion of the command block to one, and
writing the command information including a buffer list pointer in the first portion of the command block according to the conventional format; and
if the extended format is used,
setting the LE bit in the first portion to zero, and
writing the command information including a command buffer pointer, a response buffer pointer, and one or more data buffer pointers in a second portion of the command block according to the extended format.

5. The method as recited in claim 4, further comprising writing a command buffer into the second portion of the command block according to the extended format if the extended format is used.

6. A method for communicating command information from a host to a host interface port via a fixed size command block in either a conventional or extended format in a command ring in a host, comprising:
if the conventional format is used, performing a write operation in the host to write the command information including a buffer list pointer into a first portion of the command block according to the conventional format, and setting a little edition (LE) bit to one, the LE bit stored in a location within the first portion of command block that is unchanged in either the conventional or extended format according to the conventional format;
if the extended format is used, performing a write operation in the host to write the command information including a command buffer pointer, a response buffer pointer, and one or more data buffer pointers in a second portion of the command block according to the extended format, and setting the LE bit to zero;
performing a read operation in the host interface port to read the first portion of the command block and determine a state of the LE bit;

if the LE bit is set to one, utilizing the command block according to the conventional format to locate and read the command information from the first portion of the command block; and
if the LE bit is set to zero, utilizing the command block according to the extended format to locate and read the command information from the second portion of the command block.

7. The method as recited in claim 6, further comprising performing a write operation in the host to write a command buffer into the second portion of the command block according to the extended format if the extended format is used.

8. The method as recited in claim 6, further comprising:
if the LE bit is set to one,
determining the buffer list pointer from the first portion of the command block according to the conventional format, and
utilizing the buffer list pointer and one or more additional read operations to locate and read the command information.

9. The method as recited in claim 6, further comprising determining the command buffer pointer, the response buffer pointer, and the one or more data buffer pointers from the second portion of the command block if the LE bit is set to zero.

10. The method as recited in claim 9, further comprising reading a command buffer from the second portion of the command block if the LE bit is set to zero.

11. The method as recited in claim 6, further comprising sending a poll from the host to the host interface port to determine if the host interface port supports the extended format.

12. One or more storage media including a computer program which, when executed by one or more processors, causes the one or more processors to perform the steps of:
performing a read operation to read a first portion of a fixed size command block in either a conventional or extended format in a command ring within a host;
determining a state of a little edition (LE) bit stored in a location within the first portion of the command block that is unchanged in either the conventional or extended format;
utilizing the command block according to the conventional format to locate and read command information from the first portion of the command block if the LE bit is set to one; and
utilizing the command block according to the extended format to locate and read the command information from a second portion of the command block and determining a command buffer pointer, a response buffer pointer, and one or more data buffer pointers from the second portion of the command block if the LE bit is set to zero.

13. The one or more storage media as recited in claim 12, wherein the computer program, when executed by the one or more processors, causes the one or more processors to perform the further steps of:
if the LE bit is set to one,
determining a buffer list pointer from the first portion of the command block according to the conventional format, and
utilizing the buffer list pointer and one or more additional read operations to locate and read the command information.

14. The one or more storage media as recited in claim 12, wherein the computer program, when executed by the one or more processors, causes the one or more processors to perform the further step of reading a command buffer from the second portion of the command block if the LE bit is set to zero.

15. One or more storage media including a computer program which, when executed by one or more processors, causes the one or more processors to write command information in a fixed size command block in either a conventional or extended format in a command ring within a host so that it can be read by a host interface port using either the conventional or extended format, by performing the steps of:
if the conventional format is used,
setting a little edition (LE) bit in a first portion of the command block to one, and
writing the command information including a buffer list pointer in the first portion of the command block according to the conventional format; and
if the extended format is used,
setting the LE bit in the first portion to zero, and
writing the command information including a command buffer pointer, a response buffer pointer, and one or more data buffer pointers in a second portion of the command block according to the extended format.

16. The one or more storage media as recited in claim 15, wherein the computer program, when executed by one or more processors, causes the one or more processors to perform the step of writing a command buffer into the second portion of the command block according to the extended format if the extended format is used.

17. In a host interface port, one or more processors programmed for:
performing a read operation to read a first portion of a fixed size command block in either a conventional or extended format in a command ring within a host;
determining a state of a little edition (LE) bit stored in a location within the first portion of the command block that is unchanged in either the conventional or extended format;
utilizing the command block according to the conventional format to locate and read command information from the first portion of the command block if the LE bit is set to one; and
utilizing the command block according to the extended format to locate and read the command information from a second portion of the command block and determining a command buffer pointer, a response buffer pointer, and one or more data buffer pointers from the second portion of the command block if the LE bit is set to zero.

18. The one or more processors as recited in claim 17, further programmed for:
if the LE bit is set to one,
determining a buffer list pointer from the first portion of the command block according to the conventional format, and
utilizing the buffer list pointer and one or more additional read operations to locate and read the command information.

19. The one or more processors as recited in claim 17, further programmed for reading a command buffer from the second portion of the command block if the LE bit is set to zero.

20. The one or more processors as recited in claim 17, wherein the host interface port comprises a host bus adapter (HBA).

21. A server computer comprising the HBA of claim 20.

22. A storage area network (SAN) comprising the server computer of claim 21.

23. In a host, one or more processors programmed for writing command information in a fixed size command block in either a conventional or extended format in a command ring within a host so that it can be read by a host interface port using either the conventional or extended format, the one or more processors programmed for:
if the conventional format is used,
setting a little edition (LE) bit in a first portion of the command block to one, and
writing the command information including a buffer list pointer in the first portion of the command block according to the conventional format; and
if the extended format is used,
setting the LE bit in the first portion to zero, and
writing the command information including a command buffer pointer, a response buffer pointer, and one or more data buffer pointers in a second portion of the command block according to the extended format.

24. The one or more processors as recited in claim 23, further programmed for writing a command buffer into the second portion of the command block according to the extended format if the extended format is used.

25. A storage area network (SAN) comprising the host of claim 23.

26. A host for communicating command information to a host interface port, comprising:
a command ring;
one or more fixed size command blocks within the command ring, each fixed size command block in either a conventional or extended format for storing command information so that it can be read by the host interface port using either the conventional or extended format; and
one or more processors programmed for
determining whether the conventional or extended format is used for a command block, and
in response to the determination that the conventional format is used,
setting a little edition (LE) bit in a first portion of the command block to one, and
writing the command information including a buffer list pointer in the first portion of the command block according to the conventional format, and
in response to the determination that the extended format is used,
setting the LE bit in the first portion to zero, and
writing the command information including a command buffer pointer, a response buffer pointer, and one or more data buffer pointers in a second portion of the command block according to the extended format.

27. A storage area network (SAN) comprising the host of claim 26.

28. A host for communicating command information to a host interface port, comprising:
means for storing one or more fixed size command blocks, each fixed size command block in either a conventional or extended format for storing command information so that it can be read by the host interface port using either the conventional or extended format;
means for determining whether the conventional format or the extended format is used for a command block;
means for-setting a little edition (LE) bit in a first portion of the command block to one if the conventional format is used;

means for writing the command information including a buffer list pointer in the first portion of the command block according to the conventional format if the conventional format is used;

means for setting the LE bit in the first portion to zero if the extended format is used, and means for writing the command information including a command buffer pointer, a response buffer pointer, and one or more data buffer pointers in a second portion of the command block according to the extended format if the extended format is used.

* * * * *

UNITED STATES PATENT AND TRADEMARK OFFICE
CERTIFICATE OF CORRECTION

| | | |
|---|---|---|
| PATENT NO. | : 7,644,191 B2 | Page 1 of 1 |
| APPLICATION NO. | : 10/987429 | |
| DATED | : January 5, 2010 | |
| INVENTOR(S) | : Nicolson, IV et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1367 days.

Signed and Sealed this

Sixteenth Day of November, 2010

David J. Kappos
*Director of the United States Patent and Trademark Office*